No. 889,081. PATENTED MAY 26, 1908.
E. WÜRL & R. VON MATTENCLOIT.
PRESS FOR THE MANUFACTURE OF ARTICLES FROM GRANULAR
OR FIBROUS MATERIAL.
APPLICATION FILED JUNE 4, 1907.

Witnesses:

Inventors
Edward Würl
Richard von Mattencloit
By James L. Norris
Atty.

No. 889,081. PATENTED MAY 26, 1908.
E. WÜRL & R. VON MATTENCLOIT.
PRESS FOR THE MANUFACTURE OF ARTICLES FROM GRANULAR
OR FIBROUS MATERIAL.
APPLICATION FILED JUNE 4, 1907.

No. 889,081. PATENTED MAY 26, 1908.
E. WÜRL & R. VON MATTENCLOIT.
PRESS FOR THE MANUFACTURE OF ARTICLES FROM GRANULAR
OR FIBROUS MATERIAL.
APPLICATION FILED JUNE 4, 1907.

Witnesses:

Inventors
Edward Würl
Richard von Mattencloit
By James L. Norris
Atty

No. 889,081. PATENTED MAY 26, 1908.
E. WÜRL & R. VON MATTENCLOIT.
PRESS FOR THE MANUFACTURE OF ARTICLES FROM GRANULAR
OR FIBROUS MATERIAL.
APPLICATION FILED JUNE 4, 1907.

UNITED STATES PATENT OFFICE.

EDUARD WÜRL, OF PRAGUE-WEINBERGE, AND RICHARD VON MATTENCLOIT, OF PISCHELY, NEAR PRAGUE, AUSTRIA-HUNGARY.

PRESS FOR THE MANUFACTURE OF ARTICLES FROM GRANULAR OR FIBROUS MATERIAL.

No. 889,081.      Specification of Letters Patent.      Patented May 26, 1908.

Application filed June 4, 1907. Serial No. 377,273.

*To all whom it may concern:*

Be it known that we, EDUARD WÜRL and RICHARD VON MATTENCLOIT, subjects of the Emperor of Austria-Hungary, residing at Prague-Weinberge and Pischely, near Prague, respectively, both in Bohemia, Austria-Hungary, have invented certain new and useful Improvements in Presses for the Manufacture of Articles from Granular or Fibrous Material, of which the following is a specification.

This invention relates to a press which serves for the production of pressed articles in the form of tablets, cakes, briquets, and the like from plants suitable for animal food, grain, tubers, vegetables, beet slices etc. and also from leaves, peat and other fibrous materials.

This press, in which the materials to be molded can be kept under pressure for any desired time in order to impart a permanent form to the pressed articles, consists essentially of a hopper or feed-shaft for the reception and preliminary pressing of the material to be pressed, of a mold arranged beneath the hopper or feed-shaft, into which the preliminarily pressed material is pressed by means of the mold-cover which is moved down into the feed-shaft, and of a pushing-in device which introduces the filled molds successively into wedge-shaped compartments arranged in a circle around a wheel. In the rotation of this wheel, the molds, which are provided with inclined or wedge-shaped external surfaces, are driven farther and farther into the wedge-shaped compartments by pressing rollers. The molds moved on by the rotation of the wheel remain for any desired length of time under the final pressure to be applied to the pressed articles, until they are pushed out of the compartments of the press by an ejecting device. The cover of each mold is then lifted off and conducted up to the hopper or feed shaft and introduced therein, while the mold itself is opened and tilted, the finished pressed article is thrown out and the empty mold brought under the hopper or feed-shaft to be filled afresh.

In the accompanying drawings.

The material to be pressed passes in the first place into a hopper or feed-shaft, which serves for the preliminary pressing and, more especially for treating chaff, shavings, saw-dust and other materials which take up a large amount of space, is made as follows: Between two stationary parallel longitudinal walls 1, of trapezoidal form, two rectangular transverse walls 2 are mounted to turn about hinges 3, so that, in the outer limiting positions of these transverse walls, the feed-shaft forms an inverted truncated pyramid or hopper, and in the inner (vertical) limiting positions of these walls, it forms a rectangular prism. At the lower narrow end of this feed-shaft is the chamber 4 serving for the reception of the mold; the longitudinal walls 5 of this chamber lie in the planes of the walls 1, 1 of the feed-shaft, they extend on both sides beyond the mouth or opening of the feed-shaft and are provided on their inner surfaces with grooves and also with slots for guiding the molds and the parts moving the latter.

The longitudinal walls 1 of the feed-shaft are each provided in the middle with a vertical slot 6, which slots extend through the walls 5 of the chamber. These slots are closed during the filling of the feed-shaft by bars 7 which are secured to cross-heads 8 and are moved by the latter in said slots.

By the relative oscillation of the transverse walls 2 into their vertical position, the material to be pressed will receive a preliminary compression. The arrangement for moving the transverse walls 2 consists of levers 9 pivotally mounted on the longitudinal walls 1 in bearings 12, which levers are guided by means of rollers 10 in eyes 11 mounted on the transverse walls 2. On the pivot-shaft 13 of one of the levers 9, are mounted on both sides bell-crank levers 14, 15 and on the pivot-shaft 16 of the other lever 9 are mounted the two one-armed levers 17 which are each connected by means of a connecting rod 18 with the arms 14 of the bell-crank levers 14, 15. The other arms 15 of these bell-crank levers are connected by connecting rods 19 to one-armed levers 20, the pivot-shafts of which are mounted in the vertical standards of the hopper or feed-shaft 1, 2. To the arms 14 above mentioned are also connected bell-crank levers 21, 22, the pivot-shafts of which are mounted in the walls 5 of the chamber 4.

Figure 6:
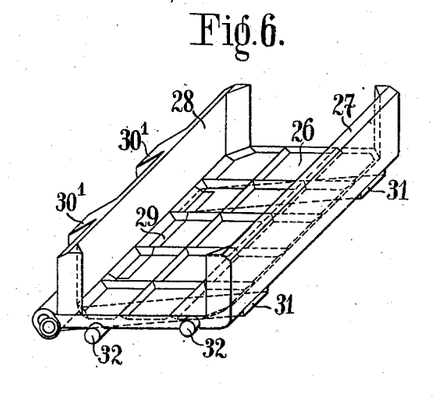
Figure 7:
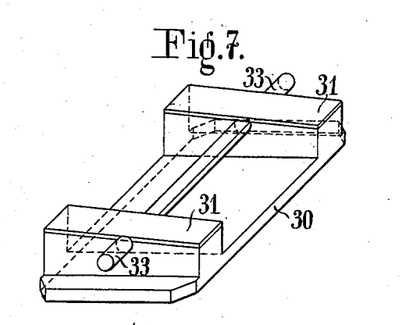

The arms 22 and the levers 20 respectively bear pins 23 and 24 which are moved by a cam 25 (Fig. 2) arranged on each of the cross-heads 8 before the cross-heads reach their lowermost and uppermost positions respectively, whereby the bell-crank levers 21, 22 and lever 20 are turned into their other limiting positions. This consequently results, during the downward motion of the cross-heads, in the pushing apart of the transverse walls 2 of the feed-shaft, and conversely, during the upward motion of said cross-heads, in the pushing or turning towards each other of the said transverse walls. When the transverse walls are vertical, the pressed material in the feed-shaft can be pressed down into the mold by the downward movement of the cover of the mold, which is introduced into the feed-shaft from above and acts like a piston, the said mold having in the meantime been pushed into the chamber 4 beneath the feed-shaft. The mold and its cover receive their motions from the press itself, the said mold being closed by the cover as soon as the latter has pressed the material in front of it out of the feed-shaft into the mold. Each of these molds (Figs. 6 and 7) consists of a bottom 26, a wall 27 made in one piece therewith, and a wall 28 arranged opposite to this and capable of turning about a hinge. The wall 28 after removal of the cover 30 can be swung outwards in order to release the pressed article, in which operation a strip 29 mounted on the wall 28 releases or detaches the pressed article from the bottom of the mold, so that the said article can slide out from the open mold. On the movable front wall 28 are mounted external wedge- or arc-shaped projections 30'. The cover 30 is formed of a plate fitting into the mold. The outsides of the cover and of the bottom are provided with inclined or wedge-shaped surfaces 31, the angle of inclination of which is equal to the angle which the plates of each press-compartment in the rotary wheel, make with each other, so that the driving of the molds into the compartments in the press can easily take place. The height of the wedges 31 is such that the cover of the mold can penetrate to a sufficient depth into the mold during the pushing of the mold into the compartment of the press. The mold and its cover are also provided with lateral projecting pins 32 and 33 respectively, which during the pressing serve for guiding these parts in grooves in the chamber 4 and in the compartments of the press.

The chamber 4 has three bottom pieces 34, 35, 36 which are separate from each other and of which the two first lie in one plane and leave clear between them an opening which permits the tilting of the mold together with the finished pressed article and the falling out of the latter after swinging round of the wall 28 of the mold. The bottom piece 36 lies above the bottom piece 35 and to some extent forms therewith an extension of the compartment of the press which is in register for the time being and which is to be filled.

Between the walls 5 of the mold-chamber and abutting against the hinges of the transverse walls 2 of the feed-shaft are arranged the vertical inclosing walls 37 and 38. The lower part of the wall 38 is made in the form of a flap 39 which, for the purpose of preventing the escape of the material to be pressed, is normally held in a vertical position by levers 40 and springs 41 (Fig. 2), these levers being mounted outside the chamber on the pivot-shaft of the flap; during the pushing of the filled mold into the compartment of the press, it yields and allows the mold to pass through.

The longitudinal grooves 42, 43, 44, 45, the grooves 46 arranged in the form of circular arcs and the transverse groove 47 cut in the inner surfaces of the longitudinal walls 5 of the chamber, serve for guiding the pins on the mold and on its cover; the grooves 42, 43 act during the transfer of the filled mold from the feed-shaft to the press-compartment; the grooves 44, 45 act during ejection from the compartment, during which operation the lifting of the cover from the mold is simultaneously effected by the grooves 45; and the arc-shaped grooves 46 and transverse grooves 47 permit the tilting and the introduction of the emptied mold beneath the feed-shaft, for which purpose the transverse grooves 47 open into the longitudinal grooves 42. The grooves 42 intersect the walls 5 of the chamber along their whole length, while the grooves 43 begin at the vertical slots 6 and are for the greater part parallel to the grooves 42. These grooves 43 and also the grooves 45 are deeper than the others and receive the pins 33 of the cover of the mold, while in the other grooves slide the guide-pins 32 of the mold. Grooves in the press compartments correspond with the longitudinal grooves 42, 43, 44, 45. In the grooves 42 are cut slots 48, into which cams 49 (Figs. 2 and 3) extend from the exterior, which cams serve to push the empty molds beneath the feed-shaft. The longitudinal grooves 45 are turned upwards (Fig. 3) at their ends which are next to the feed-shaft, in order to permit the lifting of the cover 30 of a mold ejected from the press-compartment, by means of hooks 50 engaging beneath the pins 33 of the cover.

The arc-shaped grooves 46 are closed at their upper ends by slides 51 in order that, during the ejection of the mold from the press-compartment, the pair of guide-pins on the mold coming over the arc-shaped grooves cannot prematurely slide down into these grooves 46. On the slides 51 are mounted pins 52 which extend outwards through openings in the longitudinal walls 5 of the chamber and are moved by adjustable spring or elastic cams 53 (Fig. 2) during the movement thereof in one direction in order to open the slides 51, and in the movement of these cams in the opposite direction in order to close the slides.

The clear space between the longitudinal walls 5 of the chamber beneath the feed-shaft corresponds to the width of the mold; these walls 5 therefore replace the two missing side walls of the mold. During the movement of the mold between these walls 5 towards the compartment of the press, the material pressed into the mold by its cover would be forced into the grooves 46 and 47. In order to prevent this, thin sheet metal plates 54 (Fig. 1, 3 and 5) are adjustably arranged in the inner sides of the longitudinal walls 5 of the chamber, which plates 54 close the open sides of the mold during the forward motion thereof, for which purpose they are moved along therewith until they abut against the compartment of the press at the mouth thereof, and remain stationary while the mold is pushed on into the compartment of the press, which latter also has the same internal width as the mold. The plates 54 are guided by means of slide-blocks 55 in guides 56 and are held in the guides by means of plates 58 (Figs. 2 and 5) provided with projections 57.

Figure 2:
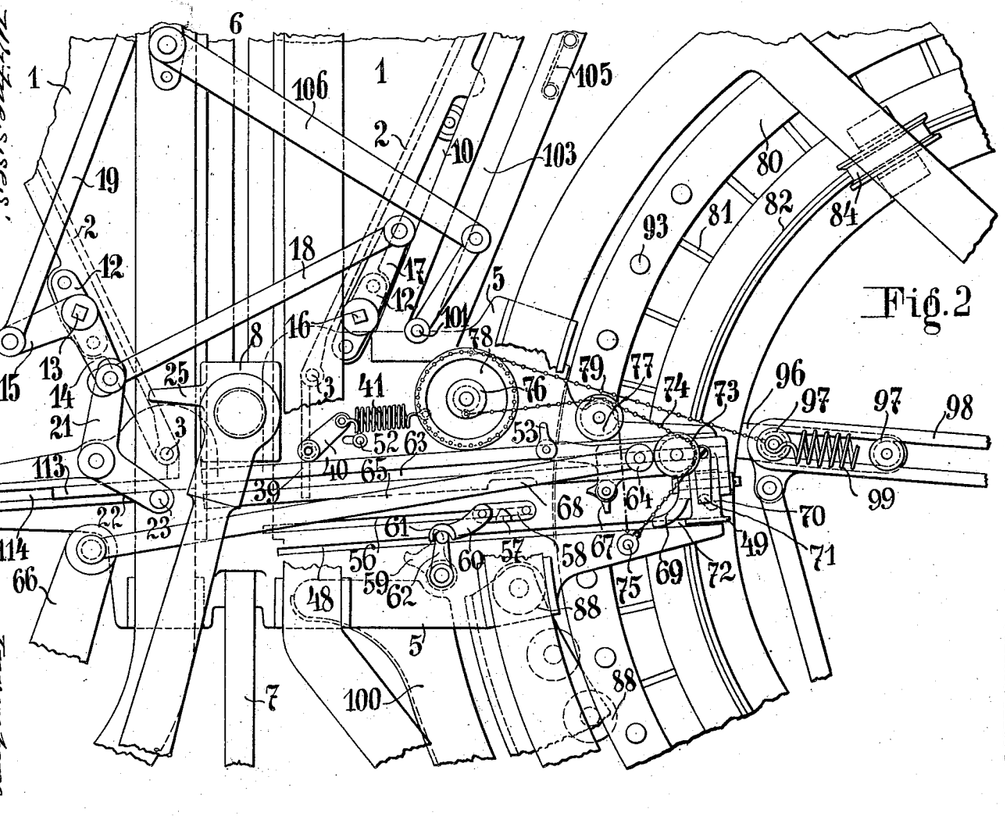
Fig. 2 is a side elevation drawn to a larger scale showing the mold-chamber beneath the hopper or feed-shaft and the adjacent parts, and also the external mechanism for effecting the various motions.
Figure 3:
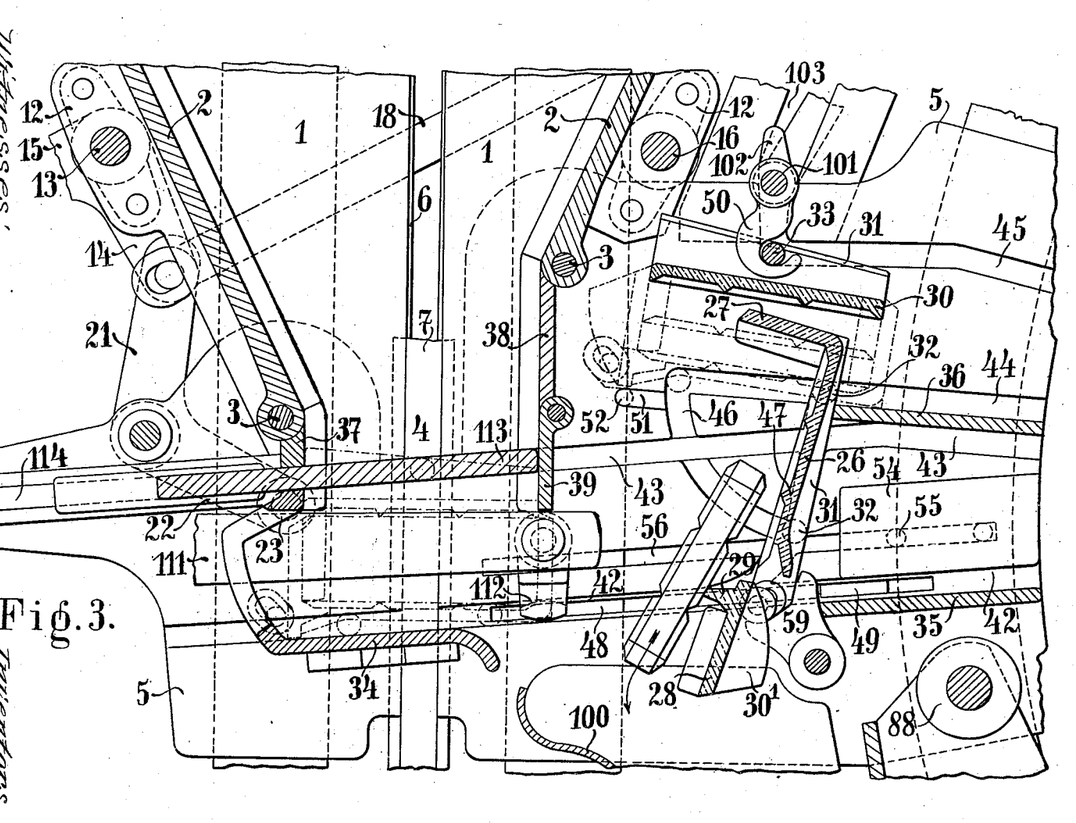
Fig. 3 is a vertical section through the said mold-chamber drawn to a still larger scale, illustrating the emptying of a mold.

Beneath the bottom piece 35 there are arranged, on the inside of the walls 5 of the chamber, the striking levers 59, which after the pushing of the mold into the compartment of the press, turn upward and lie against the edge of the bottom piece 35 (Fig. 3). During the tilting of the mold as it slides down, by reason of the movement of the slide 51, in the arc-shaped groove 46, the lower edge of the movable front wall 28 of said mold abuts against the two striking levers 59, so that the said front wall is swung downwards and the pressed article is released. The upward rotation of the levers 59 into their operative position is effected by the hooks 60 (Fig. 2) which hang loosely from the plates 58, which hooks, during the movement of the plates in the guides towards the press-compartment, engage with pins 61 on levers 62 which are rigidly mounted on the pivot-shaft of the striking lever 59 outside the chamber 4. The hook 60 hanging loosely on a pin of the plate 58 and therefore drawn along by the latter is of course constructed in detailed execution in such a manner that when the plate 58 is displaced towards the wheel the hook cannot slide beyond the pin 61 of the lever 62, but remains hooked by the pin 61 in order to be enabled to drag it behind in the said direction and at the same time to raise upwards the lever 62 as well as the striking levers 59 which are all fixedly mounted upon the same shaft.

On the outsides of the longitudinal walls 5 of the chamber are groove-like rectilinear guides 63 (Figs. 2 and 4) for the cross-heads 64, which latter are connected by connecting rods 65 to the driving levers 66 (Figs. 1 and 2), which receive their motion from the main driving shaft 110. The cross-heads 64 bear rotary double cam-pieces 67 which serve for moving the plates 58 in their guides. In the movement of the cross-heads in the direction of the press-compartment, the downwardly directed cam of each cam-piece abuts against the projection 57 on the corresponding plate 58 and these push forward the plates 54; during this motion the other cam lies against the edge of the rectilinear guide 63 and slides thereon up to the recess 68, into which it enters so that rotation of the double cam piece 67 takes place and the other cam releases itself from the projection 57 on the plate 58. The latter is therefore no longer carried along and the sheet metal plate 54 consequently remains stationary on the longitudinal wall 5 of the chamber. The hooks 60 are carried along with the plate 58, which hooks turn the striking levers 59 up into their operative position. The return of these levers is effected by projections 69 (Fig. 2) on the cross-heads 64 in the return motion of the latter towards the feed-shaft, in which motion these projections raise the hooks 60 and then move the levers 62. The pushing back of the plates 58 and of the sheet metal plates 54 connected therewith is effected by projections 70 on the inside of the cams 49 serving for pushing the empty mold under the feed-shaft (Fig. 2), which cams are pivotally suspended from the cross-heads 64 and are pressed in by means of flat springs 71 through externally arranged grooves 72 into the slots 48, in order to engage the mold.

On the cross-heads 64 (Fig. 2) are also mounted the previously mentioned cams 53 which actuate the slides 51; moreover rollers 73, over which pass chains 74, the ends of which are fixed to the longitudinal walls 5 of the chamber at 75 and also in the grooves of rollers 76, which are likewise rotatably mounted on the walls 5. The chains 74 pass over guide-rollers 77 and, in the initial position of the cross-heads, take the position indicated by dotted lines in Fig. 2 between these rollers and the fixed points 75 and in the forward motion of the cross-heads towards the compartment of the press are bent by the chain-rollers 73 into the position shown in full lines. Consequently the chains unwind from the rollers 76 and turn the latter. To the rollers 76 are rigidly connected larger rollers 78, to which are secured chains 79; these are connected to the ejecting device which is set in operation in the winding up of the chains 79 on the rollers 78 caused by the common rotation of the rollers 76 and 78.

On the chamber 4 and inclosed on both sides by the extended walls 5 thereof, abuts the rotary wheel bearing the press-compartments. It consists of two parallel rings 80, between which the plates 81 are radially inserted, which plates form the compartments serving for the reception of the filled molds and for the final pressing of the material thereon. The wheel can be fixed by means of spokes and a hub on a rotary shaft, or it can be rotatably supported by means of cylindrical rings 82 between guide-rollers 83 which are suitably mounted in the frame of the press. For the lateral support of the wheel, guide rollers 84 are employed which coact with the edges of the rings 82.

In each compartment of the press are provided grooves 85, 86, which in the registering positions of the compartment form extensions of the longitudinal grooves 42, 43 and 44, 45 in the walls 5 of the chamber and are separated from each other by pieces 87 of sheet metal which replace the missing side walls of the mold, so that the material to be pressed remains inclosed on all sides in the compartments of the press. The driving of the molds into these compartments is effected by pressing rollers 88 which are arranged along the circumference of the wheel and lie successively nearer and nearer thereto. The first of these rollers which lies next to the place where the molds are pushed in, is mounted in fixed bearings, while the others are preferably movable in their bearings and are supported by springs 89, so that in the event of excessive resistance they can yield during the driving in of the molds passing by them and resting against them by means of the wedge shaped projections 30'. Rollers of this kind can also be provided at other parts of the periphery of the wheel.

The intermittent rotation of the wheel is obtained from the driving levers 66 through the connecting rods 90 and 91 (Fig. 1) and the rocking lever 92 arranged between them. For this purpose the heads of the rods 91 are made in the form of pawls and engage with pins 93 on the wheel, which pins are arranged in the rings 80 and of which there is the same number as there are press-compartments. The heads of the rods 91 rest in slots in suspension rods 94 which are capable of turning on the frame of the press. In the forward movement of the driving levers, the rods 91 slide over the next succeeding pins 93 and hook themselves thereon. In the rearward movement of the driving levers the rods 91 press these engaged pins forward through a distance corresponding to the height of a compartment, in which operation a retaining pawl 95 places itself behind one of the pins in order to fix the position of the wheel for the time being. In the space inclosed by the wheel, is mounted the ejecting device, which consists of two rods 96 which are connected together and which are moved forward by means of rollers 97 movable in guides 98 in a radial direction towards the compartment which is in position for ejection of the mold. These guides are mounted on the frame of the press. The ejecting rods 96 are connected in the manner hereinbefore described by the chains 79 (Fig. 2) to the rollers 78 and are drawn by the rotation of said rollers towards the compartment which is in register therewith. Springs 99 effect the rearward guiding of the ejecting rods out of the press compartment when the cross heads 64 have moved back and the chains 74 have returned into their position of rest shown in dotted lines in Fig. 2.

The ejected mold slides by means of its guide pins in the grooves 85, 86 in the press compartment, is then transferred into the grooves 44, 45 in the longitudinal walls of the chamber and by reason of the divergence of these grooves, the cover 30 is lifted out of the mold. The latter then remains for a few moments on the bottom piece 36 and, by means of its front guide-pins 32 lying in the direction of motion of the mold, rests on the slides 51 which close the curved grooves 46. After opening of the latter the mold tilts about the edge of the bottom piece 36, its front pins slide down the grooves 46 and the mold strikes against the upright striking lever 59, whereby the movable front wall 28 swings downwards and by means of its strip 29 releases the finally pressed article from the mold, which article slides into the chute 100 and falls out of the press (Fig. 3). In the meantime, the lifted cover 30 of the mold is engaged at its pins 33 by the hooks 50 and lifted up out of the grooves 45. These hooks are loosely mounted on a common shaft 101 and are each provided with a cam 102. This shaft is guided in slots 103, the upper parts of which extend in a curved path over the upper opening of the feed-shaft; above their ends are arranged transverse bolts 104 (Fig. 1) which, by the striking of the cams 102 thereon, effect the unhooking of the guide pins 33 of the cover of the mold from the hooks 50. Between the two slots 103 is fixed an inclined piece of sheet metal 105 which in the lifting of the cover of the mold places the said cover into its correct position, that is to say with the end turned towards the wheel downwards and holds it in this position.

The raising of the shaft 101 together with the hooks 50 takes place by means of the one-armed levers 106 (Figs. 1 and 2) which are pivotally mounted on the standards of the feed-shaft and are engaged and lifted by the cross-heads 8; by this means the shaft 101 is moved upwards in the slots 103 until it is caused to slide over the mouth of the feed-shaft, where the cover 30 is unhooked, so that it slides down with its pins 33 in downwardly curved grooves 107 adjoining the slots 103 in the fixed walls 1 of the feed-shaft, in order that the cover shall finally deposit itself on horizontal ledges or strips 108 which are provided on the inner surfaces of these walls. The cover remains on these ledges until the cross-heads 8 reach their uppermost positions and by the striking of their cams 25 against the pins 24 begin to close the movable transverse walls 2 of the feed-shaft. During this operation, the cover, which rests on the ledges 108, is pushed by one transverse wall towards the middle of the feed-shaft and its pins are pressed into the claws 109 of the cross-heads 8 (Fig. 4).

Figure 5:
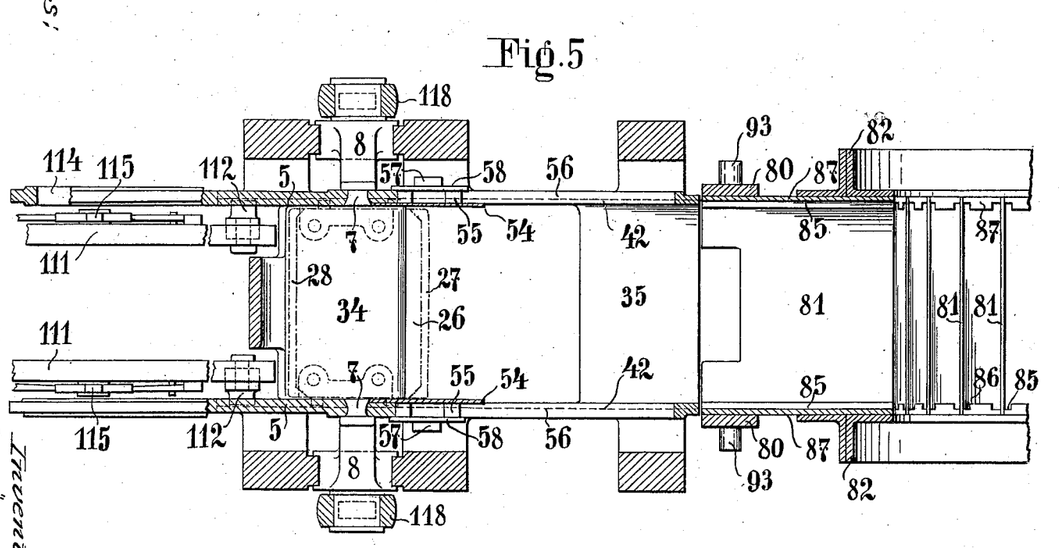
Fig. 5 is a horizontal section through the mold-chamber and Figs. 6 and 7 are perspective views of one of the molds and its cover.

On the driving lever 66 which is moved by the cranked main driving shaft 110 (Fig. 1) are jointed the presser-rods 111, which extend through openings in the front wall of the chamber 4 and serve for pushing the filled mold closed by the cover into the press-compartment opposite to the mouth of the chamber 4. The free ends of the presser rods 111 are provided with shoes 112 (Fig. 3), which operate in longitudinally-extending grooves 42, causing thereby the guiding of the presser rods 111. After the mold moves away from beneath the feed-shaft, the latter is shut off from the chamber 4 by means of a closing plate 113, so that the material in the feed-shaft cannot fall into the chamber so long as there is no mold in position beneath the mouth of the feed-shaft. This closing plate is supported in two rectilinear guides 114, which lie in one plane with the longitudinal grooves 43. In these grooves, the closing plate 113 is moved forward by the presser-rods 111 by means of cams 115 which are arranged thereon and are acted upon by springs (Fig. 1 and 5).

Figure 1:
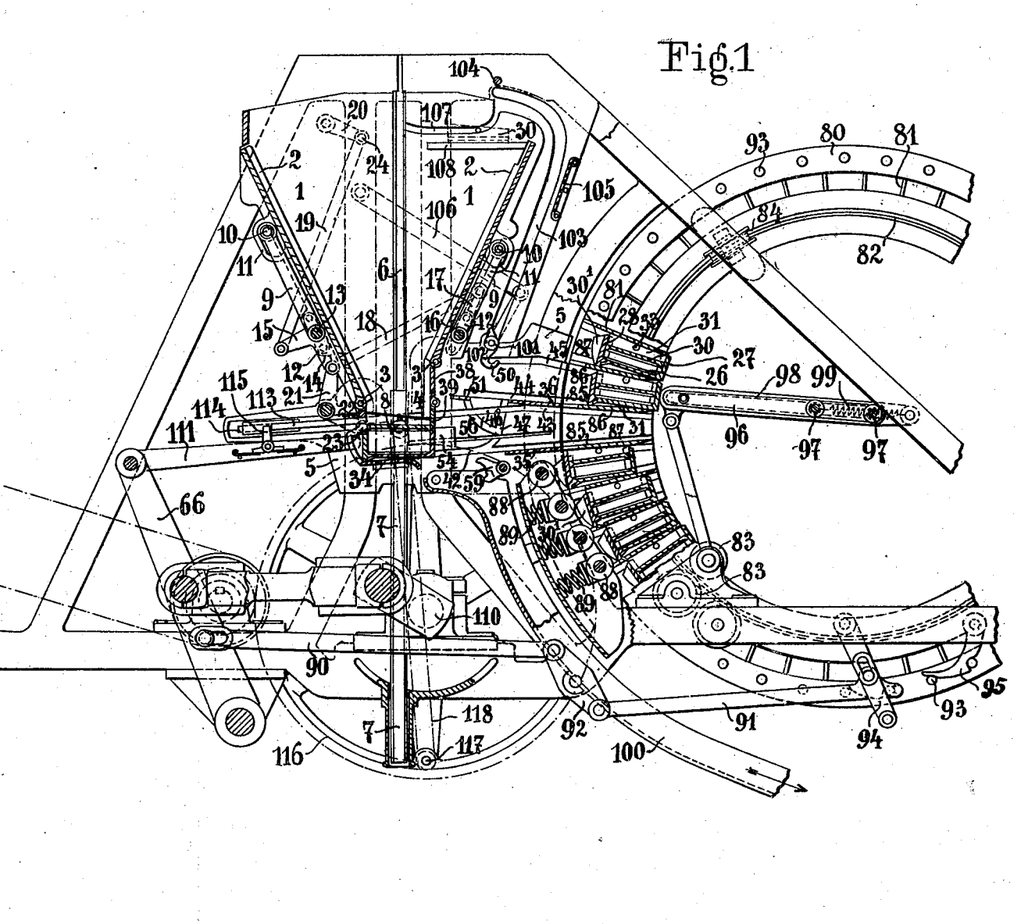
Figure 1 shows by way of example one constructional form of the improved press in longitudinal section.
Figure 4:
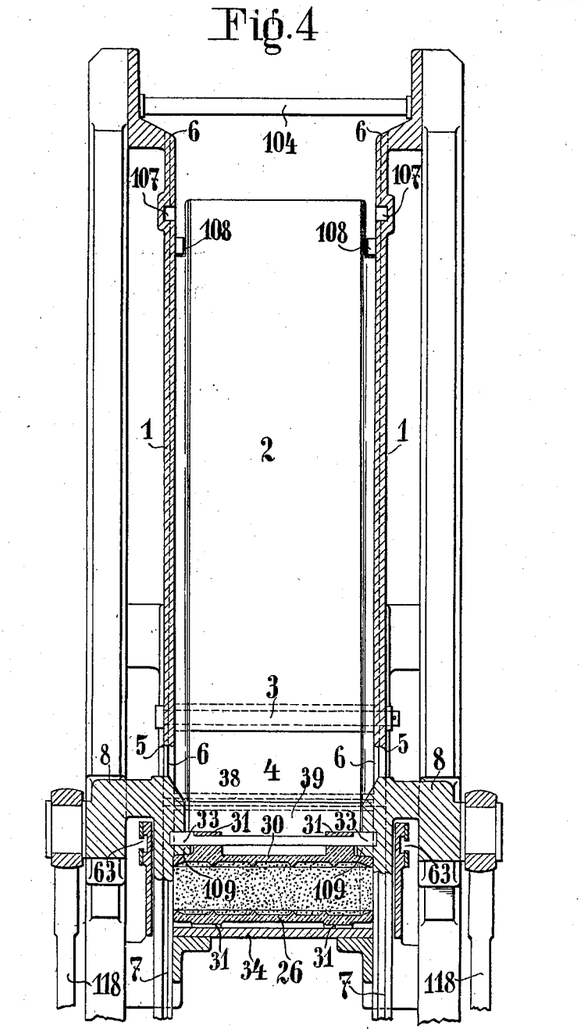
Fig. 4 is a transverse vertical section through the hopper or feed-shaft.

At the ends of the cranked main driving shaft 110 are mounted fly-wheels 116, which bear crank-pins 117 which are connected by the rods 118 to the cross-heads 8 (Figs. 1, 2 and 4). One of these fly-wheels is toothed and is driven by hand or by motive power. The frame of the press can be mounted on a stationary base or on a portable frame.

The process of pressing is as follows: After the pushing apart of the transverse walls 2 of the feed-shaft and closure of the feed shaft by the closing plate 113, the material is introduced into the feed-shaft during the upward motion of the cross-heads 8; and the press-compartments of the wheel are supplied with the empty molds. Before the cross-heads 8 reach their upper limiting positions, the transverse walls 2 of the feed-shaft are turned inwards by the abutment of the cross-head cams 25 against the pins 24 of the levers, and meanwhile the pins 33 of the cover 30 which cover is resting on the ledges 108 of the first mold to be filled, are pressed into the claws 109 (Fig. 4) of the cross-heads 8. In the subsequent downward motion of the cross-heads with the cover of the mold, the material to be pressed is forced downwards. The mold itself simultaneously with the withdrawal of the closing plate 113 is in the meantime pushed into the chamber 4 out of the corresponding suitably adjusted press-compartment of the wheel into the chamber 4. The material is now pressed into the mold by the cover of said mold acting like a piston. In this operation before the cross-heads 8 have reached their lower limiting positions, the transverse walls 2 are swung apart again, so that the feed-shaft is ready for its next charge. The filled mold is now pushed by means of the presser-rods 111 between the bottom pieces 35 and 36 towards the press-wheel and the closing plate 113 is drawn beneath the feed-shaft.

During the forcing of the filled mold into the compartment of the wheel which stands opposite thereto, the next empty mold is ejected from the press-compartment above the first named compartment by the ejecting device above the bottom piece 36 into the chamber 4. This process is repeated in the intermittent rotation of the wheel until all the press-compartments have been supplied with filled molds. These are continuously driven, by the pressing rollers 88, further into the press-compartments, and remain therein under pressure until by the continued rotation of the wheel which is effected by the driving lever 66 through the connecting rods 90 and 91, they are successively brought in front of the ejecting device. There they are pushed out over the bottom-piece 36. The cover of the ejected mold comes by means of its pins 33 into engagement with the hooks 50 which, actuated by the lever 106, lift it on to the ledges 108. The mold itself, which in the meantime rests on the slides 51, tilts downwards after the withdrawal of the slides 51 and opening of the curved grooves 46 effected by the return of the presser-rods 111, its movable front wall 28 opens and the pressed article falls into the chute 100.

The bottom of the mold box prior to being shoved into compartment 4 is not forced into an approximately horizontal position; but by means of its pins 32 it slides or descends by itself owing to its own weight into the transverse grooves 47 and then into the longitudinal grooves 42, of which the former slantingly pass into the latter, when by turning back the striking lever 59 the lower end of the bottom of the mold box is moved forwards from the position shown in full lines in Fig. 3 to the left-hand side so that the support of the tilted bottom of the mold box is withdrawn and the latter will thus be freely hanging. When after the sliding down both pairs of pins 32 of the mold box bottom have passed the spot where the transverse grooves 47, curved below towards the left-hand side, open into the longitudinal grooves 42 the bottom of the mold box will have reached its approximately horizontal position and it can be shoved into the compartment 4 without difficulty by means of the cams 49 in the direction as shown. When the rear pins 32 of the mold slide down in the transverse grooves 47 and likewise fall into the longitudinal grooves 42 they are engaged by the cams 49 extending from the outside into the slot 48 and are now pushed into the longitudinal grooves 42 towards the feed shaft on the bottom piece 34. The previously folded-down front wall 28 of the mold runs by means of its wedge-shaped projections 30' on to the downwardly-curved edge of this bottom piece 34 and is thereby again turned up into the vertical position. When the mold is closed in the manner as stated it is pushed by the cams 49 accurately beneath the feed shaft and secured in this position. In pushing the empty mold in under the feed-shaft, the closing plate 113 is again pushed back, so that the material in the feed-shaft can be pressed by the downwardly moved cover of the mold into the said mold, the transverse walls of the feed-shaft being simultaneously pressed together, whereupon the above described operations are repeated. In order that, if required, the molds may remain longer in the compartments of the press and thus under pressure, a number of wheels with press-compartments can be arranged side by side and the feed-shaft can be adjustable in front of these wheels.

What we claim is—

1. A machine of the character described, comprising a carrier provided with a plurality of wedge-shaped mold-receiving compartments, molds disconnected from each other and adapted to be forced successively into each of said compartments to be conveyed by the carrier, each of said molds having a removable cover, the walls of said compartments adapted to force the cover within the body of the mold thereby compressing the material carried by the mold, means for automatically forcing the molds into said compartments, means for automatically ejecting the molds from said compartments, and means for automatically opening the molds to discharge the compressed material therefrom.

2. A machine of the character referred to comprising a carrier provided with a plurality of wedge-shaped mold-receiving compartments, molds disconnected from each other and adapted to be forced successively into each of said compartments to be conveyed by the carrier, each of said molds having a removable cover, the walls of said compartments adapted to force the cover within the body of the mold thereby compressing the material carried by the mold, means for forcing the molds into said compartments, means for ejecting the molds from said compartments, and means for opening the molds to discharge the compressed material therefrom.

3. A machine of the character referred to comprising a mold carrier provided with a plurality of mold-receiving compartments, molds disconnected from each other and adapted to be forced successively into said compartments thereby compressing the material contained in the molds, means for automatically forcing the molds into said compartments, and means for automatically ejecting the molds from said compartments.

4. A machine of the character referred to comprising an intermittently rotatable mold carrier provided with a plurality of mold-receiving compartments, molds disconnected from each other and adapted to be forced successively into said compartments thereby compressing the material contained in the molds, means for automatically forcing the molds into said compartments, and means for automatically ejecting the molds from said compartments.

5. A machine of the character referred to comprising a mold carrier provided with a plurality of mold-receiving compartments, molds disconnected from each other and adapted to be forced successively into said compartments thereby compressing the material contained in the molds, means for forcing the molds into said compartments, and means for ejecting the molds from said compartments.

6. A machine of the character referred to comprising an intermittently rotatable mold carrier provided with a plurality of mold-receiving compartments, molds disconnected from each other and adapted to be forced successively into said compartments thereby compressing the material contained in the molds, means for forcing the molds into said compartments, and means for ejecting the molds from said compartments.

7. A machine of the character referred to comprising an intermittently rotatable mold carrier provided with a plurality of wedge-shaped mold-receiving compartments, wedge shaped molds disconnected from each other and adapted to be forced successively into each of said compartments, thereby compressing the material carried by the molds, means exterior of the carrier for supplying material to the molds, means for intermittently shifting the filled molds into said compartments, means for intermittently ejecting the molds from said compartments, and means for opening the molds after they have been ejected from said compartments to discharge the compressed material and to position the mold body in operative relation with respect to the supply means to be filled with material.

8. A machine of the character described comprising a mold carrier having a mold-receiving compartment, a sectional mold adapted to be forced into said compartment to be conveyed by the carrier and thereby compressing the material contained in the mold, means for automatically forcing the mold into said compartment, means for automatically ejecting the mold from said compartment means for automatically opening the mold after it has been ejected, causing thereby the discharge of the compressed material from the mold, and means for automatically positioning the mold in operative relation with respect to a supply means, and means for automatically opening said supply means to fill the mold with material to be compressed.

9. A machine of the character described embodying a mold comprising a body portion and cover, each of which is provided with wedge-shaped surfaces, said body portion provided with an ejecting device, and said cover and body portion formed with laterally-extending pins, said body portion further having a movable side formed with projections.

10. A machine of the character described, comprising a mold formed of a body portion and a cover, the cover being disconnected from the body portion and adapted to be forced thereinto, the bottom of said body portion and the outer face of said cover provided with transversely extending wedge-shaped surfaces, the inclination of said wedge-shaped surfaces being such that the surfaces upon the body portion will extend towards the surfaces upon the cover.

11. A machine of the character described comprising a sectional mold having the top and bottom thereof provided with peripheral wedge-shaped portions, and a mold carrier provided with a wedge-shaped compartment adapted to have said mold forced therein, causing thereby the compressing of the material carried by the mold, the latter being independent of and disconnected from the carrier.

12. A machine of the character described, comprising an intermittently rotatable mold carrier formed with a circumferentially-extending series of wedge-shaped mold-receiving compartments, wedge-shaped molds independent of each other and disconnected from the carrier and adapted to be intermittently forced into successive compartments, thereby compressing the material contained in the molds, means for successively ejecting the molds from said compartments, and means for automatically opening the ejected molds, causing thereby the discharge of the compressed material.

13. A machine of the character described comprising a carrier provided with a plurality of mold-receiving compartments, sectional molds having wedge-shaped portions, said molds disconnected from each other and adapted to be forced into said compartments, thereby compressing the material contained in the molds, a material supply means for the molds arranged exteriorly of said carrier, means for intermittently positioning the molds in operative relation with respect to said carrier, causing thereby the filling of the molds with material to be compressed, means for shifting said molds from said supply means and forcing them into said compartments, means for preliminarily compressing the material within the molds in advance of the shifting of the molds from said supply means, and means for ejecting the molds from said compartments after the material carried by the molds has been brought to a final state of compression.

14. A machine of the character described comprising a carrier provided with a plurality of mold-receiving compartments, sectional molds having wedge-shaped portions, said molds disconnected from each other and adapted to be forced into said compartments, thereby compressing the material contained in the molds, a material supply means for the molds arranged exteriorly of said carrier, means for intermittently positioning the molds in operative relation with respect to said supply means, causing thereby the filling of the molds with material to be compressed, means for shifting said molds from said supply means and forcing them into said compartments, means for preliminarily compressing the material within the molds in advance of the shifting of the molds from said supply means, means for ejecting the molds from said compartments after the material carried by the molds has been brought to a final state of compression, and means for opening the molds after they have been ejected, causing thereby the discharge of the compressed material.

15. An apparatus of the character described comprising a feed shaft, sectional molds disconnected from each other, means for positioning said molds in operative relation with respect to said feed shaft, causing thereby the filling of the molds with material to be compressed, means for closing the feed shaft after a mold has been filled, a compartment mold carrier adapted to receive the filled molds, means for shifting the molds from the feed shaft to the compartments of the carrier, means for ejecting the molds from the carrier, and means for opening the molds after they have been ejected causing thereby the discharge of the compressed material therefrom.

16. A machine of the character described comprising a feed shaft, a mold body adapted to be arranged in operative relation with respect to the feed shaft to receive therefrom the material to be compressed, a mold cover, means for shifting said mold cover to a position within the feed shaft and to move the cover towards the mold body, thereby preliminarily compressing the material, a rotatable compartment carrier, means for shifting the mold cover and body when the latter is filled from the feed shaft and forcing them into a compartment of the carrier thereby placing the material in the mold under a state of final compression, and means for ejecting the mold body and cover from said compartment.

17. A machine of the character described comprising a feed shaft, a mold body adapted to be arranged in operative relation with respect to the feed shaft to receive therefrom the material to be compressed, a mold cover, means for shifting said mold cover to a position within the feed shaft and to move the cover towards the mold body thereby preliminarily compressing the material, a rotatable compartment carrier, means for shifting the mold cover and body when the latter is filled from the feed shaft, and forcing them into a compartment of the carrier, thereby placing the material in the mold under a state of final compression, means for closing the feed shaft when the mold is shifted therefrom, means for ejecting the mold from said compartment, and means for opening the mold to discharge the compressed article.

18. A machine of the character described comprising a feed shaft, a mold body adapted to be positioned thereunder to receive the material therefrom to be compressed, a mold cover, means for shifting the mold cover down the feed shaft to preliminarily compress the material in the mold body, and a pressure-exerting means operating upon the cover and mold body, thereby finally compressing the material within the mold.

19. A machine of the character described comprising a feed shaft, a mold body adapted to be positioned thereunder to receive the material therefrom to be compressed, a mold cover, means for shifting the mold cover down the feed shaft to preliminarily compress the material in the mold body, a pressure-exerting means operating upon the cover and mold body thereby finally compressing the material within the mold, and means for shifting the mold body and its cover within said pressure-exerting means.

20. A machine of the character described comprising a feed shaft, a mold body adapted to be positioned thereunder to receive the material therefrom to be compressed, a mold cover, means for shifting the mold cover down the feed shaft to preliminarily compress the material in the mold body, a pressure-exerting means operating upon the cover and mold body, thereby finally compressing the material within the mold, means for shifting the mold body and its cover within said pressure-exerting means, means for shifting the mold body and cover from said pressure-exerting means, and means for opening the mold after it has been subjected to said pressure-exerting means thereby discharging the compressed article.

21. A machine of the character described comprising a rotatable mold-carrier provided with a plurality of mold-receiving compartments, molds disconnected from each other adapted to be shifted into said compartments, and a pressure-exerting means arranged exteriorly of said carrier and engaging the molds thereby gradually forcing the molds into said compartments.

22. A machine of the character described comprising an intermittently rotatable mold-carrier provided with a circumferentially-extending series of mold-receiving compartments, molds disconnected from each other, mold-filling means, means for shifting the filled molds to said compartments, and a pressure-exerting means arranged exteriorly of said carrier and adapted to engage the molds for forcing them into the compartments.

23. A machine of the character described, comprising an intermittently rotatable carrier provided with a circumferentially-extending series of mold-receiving compartments, molds, mold-filling means, means for shifting the filled molds to said compartments, and a series of pressing rollers arranged exteriorly of said carrier and adapted to engage said molds, thereby forcing the material into said compartments.

24. A machine of the character described comprising an intermittently rotatable mold-carrier provided with a circumferentially-extending series of mold-receiving compartments, molds, mold-filling means, means for shifting the filled molds to said compartments, a pressure-exerting means arranged exteriorly of said carrier and adapted to engage the molds for forcing them into the compartments, means for intermittently ejecting the molds from said compartments, and means for opening the molds, causing thereby the discharge of the compressed article.

25. A machine of the character described comprising an intermittently rotatable mold-carrier provided with a series of mold-receiving compartments, molds, a mold-filling device, means for successively inserting the molds in said compartments, a pressure-exerting means for forcing said molds into said compartments, means for ejecting the molds from the compartments, and means for opening the molds to discharge the compressed article.

26. A machine of the character described comprising a rotatable mold-carrier provided with a series of mold-receiving compartments, the top and bottom walls of each of said compartments being inclined, and wedge-shaped molds adapted to be successively forced into said compartments, causing thereby the compression of the material carried by the molds.

27. A machine of the character described comprising a rotatable mold-carrier provided with a series of mold-receiving compartments, the top and bottom walls of each of said compartments being inclined, wedge-shaped molds adapted to be successively forced into said compartments, causing thereby the compression of the material carried by the molds, and means for successively discharging the molds from said compartments.

28. A machine of the character described comprising an intermittently rotatable carrier provided with a circumferentially-extending series of mold-receiving compartments, molds, a mold-filling device for supplying material to the molds, means for preliminarily compressing the material supplied to the molds, means for successively inserting the filled molds into said compartments, and a pressure-exerting means for forcing the molds deeper into said compartments.

29. A machine of the character described comprising a compartment mold-carrier, molds adapted to contain material to be compressed, means for preliminarily compressing the material carried by the molds, and means for successively shifting and forcing the molds into said compartments.

30. A machine of the character described comprising a mold-carrier provided with a plurality of wedge-shaped compartments, wedge-shaped molds adapted to contain the material to be compressed, and means for successively forcing said molds into said compartments, thereby compressing the material contained therein.

31. A machine of the character described, comprising a mold-carrier provided with a plurality of wedge-shaped compartments, wedge-shaped molds adapted to contain the material to be compressed, means for successively forcing said molds into said compartments thereby compressing the material contained therein, and means for successively ejecting the molds from said compartments.

32. A machine of the character described, comprising a mold-carrier provided with a plurality of wedge-shaped compartments, wedge-shaped molds adapted to contain the material to be compressed, means for successively forcing said molds into said compartments thereby compressing the material contained therein, means for successively ejecting the molds from said compartments, and means for opening the molds, causing thereby the discharge of the compressed article.

33. A machine of the character described comprising a carrier having a plurality of wedge-shaped mold-receiving compartments, wedge-shaped molds adapted to receive the material to be compressed, means for preliminarily compressing the material supplied to the molds, and means for forcing the molds after the preliminary compression of the material into said wedge-shaped compartments, causing thereby the final compression of the material contained in the molds.

34. A machine of the character described, comprising a carrier having a plurality of wedge-shaped mold-receiving compartments, wedge-shaped molds adapted to receive the material to be compressed, means for preliminarily compressing the material supplied to the molds, means for forcing the molds after the preliminary compression of the material into said wedge-shaped compartments, causing thereby the final compression of the material contained in the molds, and means for ejecting the molds from said compartments.

35. A machine of the character described, comprising a carrier having a plurality of wedge-shaped mold-receiving compartments, wedge-shaped molds adapted to receive the material to be compressed, means for preliminarily compressing the material supplied to the molds, means for forcing the molds after the preliminary compression of the material into said wedge-shaped compartments, causing thereby the final compression of the material contained in the molds, means for ejecting the molds from said compartments, and means for opening the molds after being ejected from said compartments, causing thereby the discharge of the compressed article.

36. A machine of the class described embodying a plurality of molds, each of which comprises a cover and a body portion, said cover having wedge-shaped surfaces and said body portion having wedge-shaped surfaces, one of the walls of said body portion being hinged and said body portion further provided with means for releasing the molded article when the mold is opened.

37. A machine of the character described, comprising a mold-receiving means having two inclined surfaces, and a mold formed of a plurality of shiftable sections having wedge-shaped surfaces and adapted to be forced between said inclined surfaces, causing thereby the compression of the material contained in the mold.

In testimony whereof we have hereunto set our hands in presence of two subscribing witnesses.

EDUARD WÜRL.
RICHARD VON MATTENCLOIT.

Witnesses:
ADOLPH FISCHER,
ARTHUR SCHWEZ.